United States Patent
Mikiya et al.

(10) Patent No.: US 6,827,329 B2
(45) Date of Patent: Dec. 7, 2004

(54) PIPE COUPLING

(75) Inventors: Toshio Mikiya, Tokyo (JP); Reichi Makishima, Tokyo (JP); Hidemi Seki, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/608,947

(22) Filed: Jun. 26, 2003

(65) Prior Publication Data

US 2004/0051070 A1 Mar. 18, 2004

(30) Foreign Application Priority Data

Jun. 28, 2002 (JP) .......................................... 2002-189719

(51) Int. Cl.$^7$ .................................................. F16K 35/02
(52) U.S. Cl. ........................ 251/97; 251/113; 251/149.2; 251/149.9; 137/616.7
(58) Field of Search ........................... 251/149.2, 149.9, 251/96, 97, 111, 113; 137/616.7

(56) References Cited

U.S. PATENT DOCUMENTS

| 2,493,271 A | | 1/1950 | Smith et al. |
|---|---|---|---|
| 4,397,445 A | * | 8/1983 | Burquier .................. 251/149.9 |
| 4,905,965 A | | 3/1990 | Dolev |
| 4,982,929 A | * | 1/1991 | Spurling .................. 251/149.9 |
| 5,050,841 A | | 9/1991 | Jacobsson |
| 5,326,072 A | | 7/1994 | Wuthrich |
| 5,562,273 A | | 10/1996 | Wuethrich |
| 5,681,027 A | | 10/1997 | Wuethrich |
| 6,089,539 A | * | 7/2000 | Kouda ..................... 251/149.2 |
| 6,422,267 B1 | * | 7/2002 | Makishima et al. ..... 251/149.2 |
| 2002/0062872 A1 | | 5/2002 | Makishima et al. |

* cited by examiner

*Primary Examiner*—John Bastianelli
(74) *Attorney, Agent, or Firm*—John P. White; Cooper & Dunham LLP

(57) ABSTRACT

A pipe coupling comprises a socket having a ball valve in which a through bore having one end that allows insertion of a plug is formed and a casing supporting the ball valve for rocking motion. The casing has a slot extending from its flank to the top. The slot has a flank opening and a top opening. The flank opening is wider than the top opening. A lock element is located for movement in the through bore of the ball valve. When the one end of the through bore of the ball valve is aligned with the flank opening, the lock element advances into the flank opening, thereby preventing the ball valve from rocking. When the lock element is pushed into the through bore of the ball valve by the plug, it is disengaged from the flank opening, whereupon the ball valve is allowed to rock.

7 Claims, 4 Drawing Sheets

PIPE COUPLING

CROSS-REFERENCE TO RELATED APPLICATIONS

This application is based upon and claims the benefit of priority from the prior Japanese Patent Application No. 2002-189719, filed Jun. 28, 2002, the entire contents of which are incorporated herein by reference.

BACKGROUND OF THE INVENTION

1. Field of the Invention

The present invention relates to a pipe coupling for fluid, the coupling comprises a socket and a plug that can be connected to each other.

2. Description of the Related Art

Conventionally, a pipe coupling of this type comprises a plug body and a socket. The plug has a distal end portion, an axial bore opening in the distal end portion, and an outer peripheral portion on which a projection is formed. The socket is connected to the plug body. It is provided with a main cylinder having an axial bore, which extends between first and second end portions and through which a fluid can flow.

The socket of the pipe coupling comprises a ball valve and an annular seal unit. The ball valve has a through bore formed having one end capable of receiving the distal end portion of the plug body and the other end portion capable of communicating with the axial bore. The ball valve is located at a first end portion of the main cylinder and controls the axial bore in an open-close condition. The seal unit is located near the first end portion in the axial bore and has a distal end portion formed having a ball valve receiving surface in sealed engagement with the ball valve. In order to support the ball valve in conjunction with the ball valve receiving surface, moreover, the socket comprises a casing, which has a base portion fixed to the first end portion of the main cylinder, a top portion opposed to the base portion, a flank portion located between the first end portion and the top portion, and a slot extending from the flank portion to the top portion. The slot has a flank opening and a top opening. When the other end of the through bore is disconnected from the axial bore of the main cylinder, the flank opening is aligned with the one end of the through bore, and the projection of the plug body can be passed through the flank opening. When the other end of the through bore communicates with the axial bore of the main cylinder, the top opening is aligned with the one end of the through bore and engages the projection. Thus, the ball valve can be rocked by the plug body in the one end of the through bore between a position in which the other end of the through bore communicates with the axial bore of the main cylinder and a position in which the other end is disconnected from the axial bore.

According to the pipe coupling constructed in this manner, however, the ball valve that is surrounded by the casing and supported by the main cylinder is rockable, and it is not in any way restricted in its rocking motion. If a shock acts on the socket that is not connected with the plug, from any cause, for example, the ball valve may rock under the influence of the shock, in some cases, so that the through bore fails to be opposed to the slot of the casing; that is, it is disengaged from the slot. Accordingly, it is hard to insert the plug body into the through bore of the valve through the slot of the casing. In other cases, the through bore may unexpectedly communicate with the fluid passage of the main cylinder as the ball valve rocks, or the valve may open. As long as the outside diameter of the plug body is smaller than the diameter of the through bore of the ball valve, moreover, the plug body can be inserted into the through bore. Thus, a wrong plug can inevitably be inserted into the through bore of the ball valve to rock the valve, thereby opening the through bore.

BRIEF SUMMARY OF THE INVENTION

The object of the present invention is to provide a pipe coupling in which the movement of a ball valve is restricted when a plug is not connected, so that the plug can be connected securely, wrong operation of the ball valve can be prevented, and the connected plug never fails to be an appropriate one.

In order to achieve the above object of the present invention, there is provided a pipe coupling which comprises a plug body having a distal end portion, an axial bore opening in the distal end portion, and an outer peripheral portion on which a projection is formed, and a socket main cylinder having first and second end portions and an axial bore which extends between the end portions and through which a fluid can flow. Further, the pipe coupling comprises a ball valve which has a through bore formed having one end capable of receiving the distal end portion of the plug body and the other end portion capable of communicating with the axial bore, is located at a first end portion of the socket main cylinder, and controls the axial bore in an open-close condition; an annular seal unit located near the first end portion in the axial bore and having a distal end portion formed having a ball valve receiving surface in sealed engagement with the ball valve; and a casing which has a base portion fixed to the first end portion of the socket main cylinder, a top portion opposed to the base portion, a flank portion located between the first end portion and the top portion, and a slot extending from the flank portion to the top portion and which supports the ball valve in conjunction with the ball valve receiving surface. The slot has a flank opening, which is aligned with the one end of the through bore and through which the projection of the plug body can be passed when the other end of the through bore is disconnected from the axial bore of the socket main cylinder, and a top opening, which is aligned with the one end of the through bore and engages the projection when the other end of the through bore communicates with the axial bore of the socket main cylinder, so that the ball valve is rocked by the plug body in the one end of the through bore between a position in which the other end of the through bore communicates with the axial bore of the socket main cylinder and a position in which the other end is disconnected from the axial bore. The pipe coupling of the invention further comprises a lock element located for reciprocation in the through bore of the ball valve, the lock element being urged toward the one end and adapted to move into the flank opening to prevent the ball valve from rocking with respect to the casing when the one end of the through bore of the ball valve is aligned with the flank opening and to move into the through bore of the ball valve to allow the ball valve to rock with respect to the casing when the plug body is inserted into the one end of the through bore.

According to this pipe coupling, the lock element in the through bore of the ball valve advances urged by a spring and projects into the flank opening when the one end of the through bore is aligned with a position on the flank opening side of the slot of the casing. The lock element can engage the peripheral end edge of the slot on the top opening side.

If a force to rock the ball valve acts from any cause in this state, the advanced lock element engages the peripheral end edge of the flank opening, thereby preventing the valve from rocking. Thus, the through bore of the ball valve is kept ready for the passage of the plug, and the valve is prevented from opening. If the plug body is inserted into the through bore of the ball valve in connecting the plug, the advanced lock element is pushed by the plug and retreats. Thereupon, it is disengaged from the peripheral end edge of the flank opening, thereby allowing the ball valve to rock. Thus, the plug and the socket can be connected by rocking the plug body in the through bore of the valve from the flank opening of the slot. The plug can be disconnected from the socket by rocking the plug body toward the flank opening of the slot with the lock element being retreated and then drawing it out of the through bore of the ball valve. When the plug is drawn out of the through bore of the valve, the lock element advances urged by the spring and engages with the flank opening of the slot, whereupon the valve is prevented from rocking. Thus, the through bore of the ball valve is kept ready for the passage of the plug, so that the plug can be reconnected securely.

According to the pipe coupling of the invention, therefore, the lock element prevents the ball valve of the socket from rocking when the plug is not connected to the socket. If a shock acts on the socket from any cause, thereby urging the ball valve to rock, the through bore of the ball valve is kept opened on the flank opening side so that the plug can be passed through it. Thus, the ball valve can be securely prevented from rocking and hindering the connection of the plug or from opening.

Preferably, the lock element comprises a cylindrical element, having an outer peripheral portion smaller in diameter than the flank opening and an inner peripheral portion larger in diameter than the distal end portion of the plug body, and a retaining step portion protruding from the outer peripheral portion of the cylindrical element and having a diameter larger than that of the flank opening. And more preferably, the lock element has a retaining step portion inwardly protruding from the inner peripheral portion and capable of engaging the projection of the plug body.

In this case, the outside diameter and the shape of the outer peripheral surface of the plug body are restricted by the inside diameter and the shape of the inner peripheral surface of the cylindrical lock element that is slidable in the through bore of the ball valve. Thus, the plug to be connected can be specified, so that improper plug connection can be prevented.

Preferably, moreover, the axial bore is formed of a stepped bore having a large-diameter portion and a small-diameter portion, and the seal unit has an annular seal holding member located in the large-diameter portion for axial movement, a collar located in the seal holding member for axial movement, and a seal ring located between the seal holding member and the collar and in sealed engagement with the ball valve.

Preferably, the casing has a fitting projection protruding from the peripheral portion of the top opening, and the plug body has a lock member which is stopped by the fitting projection to prevent the movement of the ball valve when the ball valve is rocked from the position in which the other end of the through bore is disconnected from the axial bore of the socket main cylinder to the position in which the other end communicates with the axial bore. Preferably, moreover, the lock member is urged toward the distal end portion of the plug body.

According to the present invention, moreover, there is provided a socket which forms a pipe coupling in conjunction with a plug having a distal end portion, an axial bore opening in the distal end portion, and an outer peripheral portion on which a projection is formed. The socket comprises a main cylinder having first and second end portions and an axial bore which extends between the end portions and through which a fluid can flow; a ball valve which has a through bore formed having one end capable of receiving the distal end portion of the plug and the other end portion capable of communicating with the axial bore, is located at a first end portion of the main cylinder, and controls the axial bore in an open-close condition; an annular seal unit located near the first end portion in the axial bore and having a distal end portion formed having a ball valve receiving surface in sealed engagement with the ball valve; and a casing which has a base portion fixed to the first end portion of the main cylinder, a top portion opposed to the base portion, a flank portion located between the first end portion and the top portion, and a slot extending from the flank portion to the top portion and which supports the ball valve in conjunction with the ball valve receiving surface. The slot has a flank opening, which is aligned with the one end of the through bore and through which the projection of the plug can be passed when the other end of the through bore is disconnected from the axial bore of the main cylinder, and a top opening, which is aligned with the one end of the through bore and engages the projection when the other end of the through bore communicates with the axial bore of the main cylinder, so that the ball valve is rocked by the plug in the one end of the through bore between a position in which the other end of the through bore communicates with the axial bore of the main cylinder and a position in which the other end is disconnected from the axial bore. Further, the socket comprises a lock element located for reciprocation in the through bore of the ball valve, the lock element being urged toward the one end and adapted to move into the flank opening to prevent the ball valve from rocking with respect to the casing when the one end of the through bore of the ball valve is aligned with the flank opening and to move into the through bore of the ball valve to allow the ball valve to rock with respect to the casing when the plug is inserted into the one end of the through bore.

DETAILED DESCRIPTION OF THE INVENTION

Figure 1:
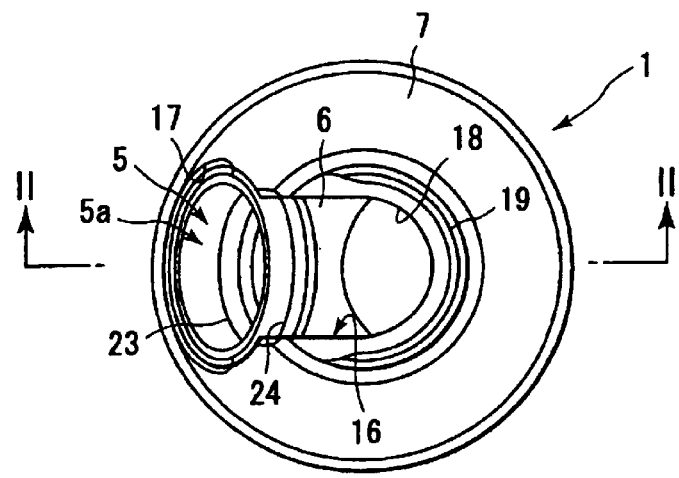
FIG. 1 is a plan view showing a socket that constitutes a pipe coupling according to a preferred embodiment of the present invention.

In the drawings, numeral 1 denotes a socket, and numeral 2 denotes a plug to be connected to the socket 1. The socket 1 comprises a main cylinder 4, a ball valve 6, and a casing 7. The main cylinder 4 has an axially extending stepped bore in which a fluid passage 3 is defined. The valve 6, which has a through bore 5, is located in the main cylinder 4 for rocking motion. A plug body 2a of the plug 2 is inserted into the through bore 5 from its one end. The casing 7 is screwed on the main cylinder 4 and surrounds and supports the ball valve 6 for rocking motion.

A large-diameter recess 8 is formed in the distal end portion of the fluid passage 3. An annular seal holding member 9 that is coaxial with the fluid passage 3 is fitted in the recess 8 for axial sliding motion. A seal ring 10 for sealing the gap between the holding member 9 and the recess 8 is fitted on the holding member 9. The distal end of the holding member 9 is formed having a ball valve receiving surface 11 that receives the ball valve 6. The ball valve 6 rockably engages the receiving surface 11. The receiving surface 11 is fitted with a seal ring 12 that seals the gap between the surface 11 and the valve 6. A collar 13 is fitted in the distal end portion of the holding member 9. The collar 13 presses the seal ring 12 on the receiving surface 11 from the inner peripheral side. The holding member 9, seal ring 12, and collar 13 form an annular seal unit. A spring 14 for urging the holding member 9 toward the ball valve 6 is interposed between the member 9 and the large-diameter recess 8. A seal ring 15 for sealing the gap between the through bore 5 in the ball valve 6 and the plug body 2a therein is fitted in the inner part of the bore 5.

A plug passage slot 16 opens in the casing 7, ranging from its flank to top. A casing flank opening 17 of the slot 16 forms a wide portion in which a stopper bulge (mentioned later) on the outer periphery of the plug body 2a can be inserted. A casing top opening 18 forms a narrow portion the side edge of which engages the stopper bulge, thereby preventing the plug body 2a from slipping off.

The slot 16 of the casing 7 and the through bore 5 of the ball valve 6 are arranged in the following relation. The ball valve 6 closes the fluid passage 3 of the socket 1 or the main cylinder 4 (FIG. 2) when one end or a plug-side opening 5a of the through bore 5 is located on the side of the casing flank opening 17 of the plug passage slot 16. The through bore 5 and the fluid passage 3 are aligned and communicate with each other when the opening 5a of the bore 5 is located on the side of the casing top opening 18.

Further, the top portion of casing 7 is formed having a fitting projection 19 that extends along the peripheral edge of an end portion of the casing top opening 18 of the slot 16. The projection 19 is fitted with a lock member (mentioned later) on the plug body 2a.

Furthermore, a lock element 21 is located in the through bore 5 of the ball valve 6 for axial movement. It is urged by a spring 20 to advance. The lock element 21 can advance and engage the peripheral end edge of the casing flank opening 17 when the plug-side opening 5a of the bore 5 of the valve 6 is located on the side of the opening 17 or the wide portion of the slot 16. If the ball valve 6 is urged to rock, the lock element 21 engages the peripheral end edge of the opening 17, thereby preventing the valve 6 from rocking. As the plug body 2a is then inserted into the bore 5 of the valve 6, moreover, the lock element 21 is pushed and retreats. Thereupon, it is disengaged from the peripheral edge portion of the opening 17, thereby allowing the ball valve 6 to rock.

In the present embodiment, the lock element 21 is formed of a cylinder, which is movably fitted in the plug-side opening 5a of the through bore 5 of the ball valve 6, and is urged by the spring 20 to advance. The outside diameter of the distal end portion of the cylindrical lock element 21 is smaller than the inside diameter of the casing flank opening 17 of the slot 16. The element 21 has an inside diameter such that the plug body 2a can be fitted in it.

A retaining step portion 23 protrudes from the inner peripheral surface of the lock element 21. It engages a projection 22 on the outer peripheral surface of the plug body 2a. As the plug body 2a is inserted into the through bore 5 of the ball valve 6, the retaining step portion 23 on the inner peripheral surface of the lock element 21 that is fitted on the plug body 2a is stopped and pushed to be retreated by the projection 22 on the outer peripheral surface of the plug body 2a. The retaining step portion 23 may be made projecting to match the type of the plug 2. In the present embodiment, the stopper bulge (mentioned later) that is formed on the outer periphery of the plug body 2a is used as the projection 22.

A large-diameter retaining step portion 24 is formed on the outer peripheral surface of the lock element 21. Its diameter is larger than the inside diameter of the casing flank opening 17. If the lock element 21 advances from the through bore 5 of the ball valve 6 when the bore 5 is situated on the side of the casing flank opening 17, the retaining step portion 24 on the outer peripheral surface of the lock element 21 engages the inner surface of the peripheral edge of the opening 17. Thus, the lock element 21 can be prevented from slipping out of the bore 5.

In the plug 2 that is inserted into the through bore 5 in the ball valve 6 of the socket 1, the plug body 2a has a fluid passage 25 therein and a stopper bulge 26 that protrudes from its outer periphery. The bulge 26 can be inserted into the casing 7 through the casing flank opening 17 of the slot 16 of the casing 7 when the plug body 2a is inserted into through bore 5 of the ball valve 6 that opens in the position of the opening 17. When the plug body 2a that is inserted in the bore 5 is rocked toward the casing top opening 18 of the slot 16, the stopper bulge 26 engages the inner surface of the side edge of the opening 18. As the bulge 26 engages the inner surface of the side edge of the opening 18 of the slot 16, the plug body 2a is prevented from slipping out of the through bore 5 of the ball valve 6, whereupon the socket 1 and the plug 2 are connected to each other. According to the present embodiment, as mentioned before, moreover, the stopper bulge 26 doubles as the projection 22 on the outer peripheral surface of the plug body 2a that engages the retaining step portion 23 on the inner peripheral surface of the lock element 21. If the plug body 2a is passed through the bore 5 of the valve 6, the bulge 26 engages the step portion 23 of the lock element 21, thereby causing the element 21 to retreat.

Further, the plug 2 is provided with a lock member 27, which is fitted on the fitting projection 19 on the casing top opening 18 of the slot 16 of the casing 7 if the fluid passages 25 and 3 communicate with each other so that the plug 2 and the socket 1 are connected to each other with the plug body 2a situated in the top opening 18.

The lock member 27 is a cylindrical member that is fitted on the plug body 2a for axial movement. If it advances, it is fitted on the fitting projection 19. If the lock member 27 retreats, it is disengaged from the projection 19. The cylindrical lock member 27 is urged by a spring 28 to advance.

In connecting the plug 2 and the socket 1, the lock member 27 is retreated against the biasing force of the spring 28. In this state, the plug body 2a that is inserted in the through bore 5 of the ball valve 6 is rocked along the slot 16 of the casing 7 toward the top portion of the casing 7 and is situated in the casing top opening 18. If the retreat of the lock member 27 is canceled when the socket 1 and the plug 2 are connected to each other, the member 27 advances urged by the spring 28, and is fitted on the fitting projection 19 on the top opening 18 of the casing 7. Thereupon, the plug 2 is prevented from rocking toward the casing flank opening 17 of the slot 16, and the socket 1 and the plug 2 are locked in their connected state. Numeral 29 denotes a stop ring that prevents the lock member 27 from slipping out in its advancing direction.

Figure 2:
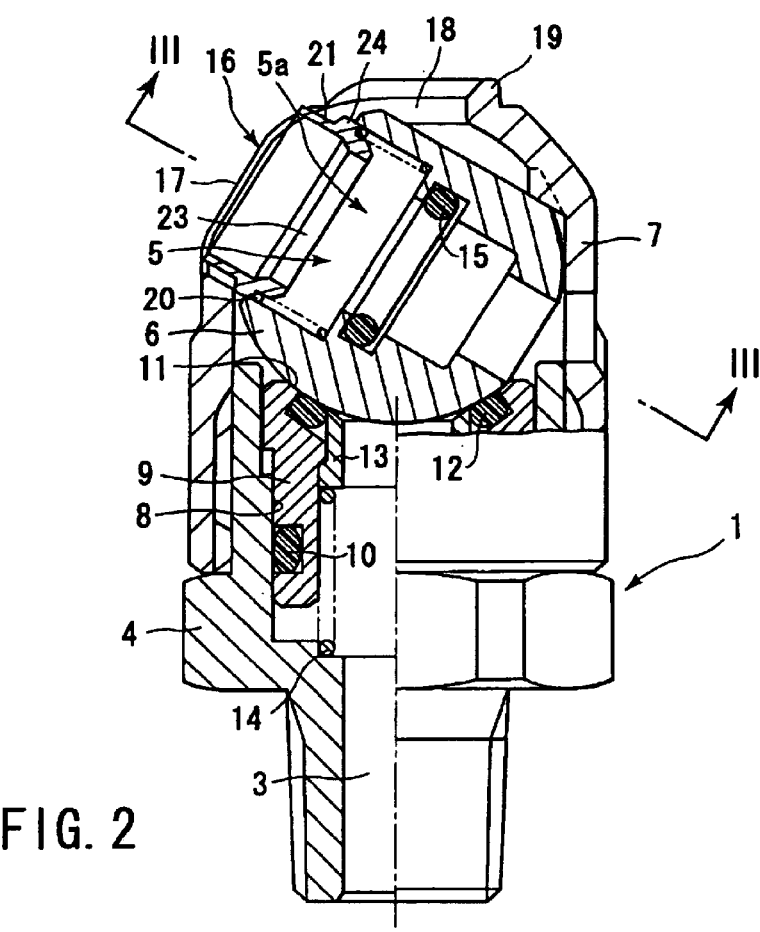
FIG. 2 is a partial sectional view taken along line II—II of FIG. 1.
Figure 3:
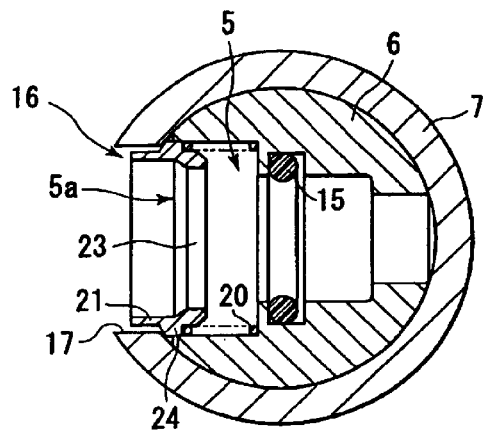
FIG. 3 is an end view taken along line III—III of FIG. 2.
Figure 4:
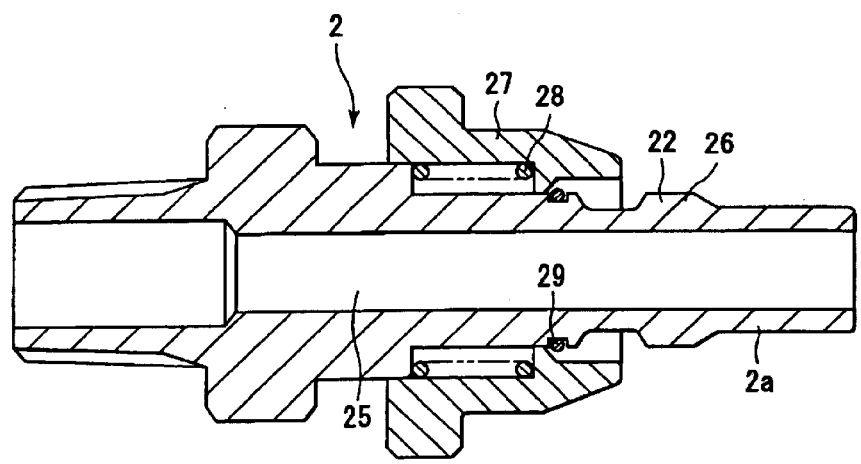
FIG. 4 is a sectional view showing a plug that constitutes the pipe coupling according to the preferred embodiment of the invention.

According to the pipe coupling constructed in this manner, the lock element 21 in the through bore 5 of the ball valve 6 of the socket 1 is urged by the spring 20 to advance when the plug-side opening 5a of the valve 6 is situated on the side of the casing flank opening 17 of the slot 16 of the casing 7 with the plug 2 not connected to the socket 1. Thus, the lock element 21 can engage the peripheral end edge of the casing flank opening 17 of the slot 16 of the casing 7 (FIG. 2). If a shock acts on the socket 1 from any cause, thereby urging the ball valve 6 to rock, the advanced lock element 21 engages the peripheral end edge of the opening 17, thereby preventing the valve 6 from rocking. Accordingly, the through bore 5 of the valve 6 is kept opening on the side of the casing flank opening 17 so that the plug 2 can be passed through it. Thus, the ball valve 6 can be prevented from rocking and hindering the connection of the plug 2 or from opening.

Figure 5:
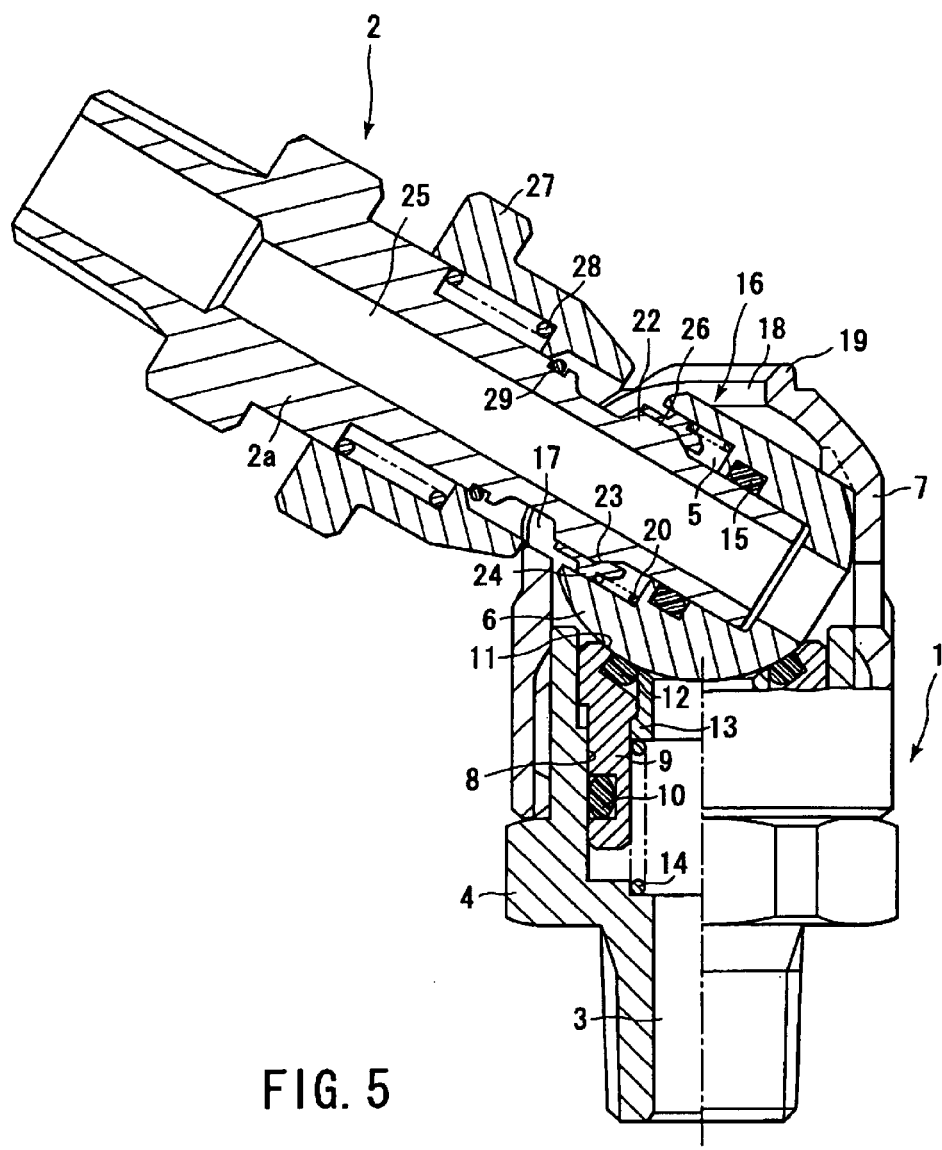
FIG. 5 is a sectional view showing the way the plug shown in FIG. 4 is inserted into a through bore of a ball valve of the socket.
Figure 6:
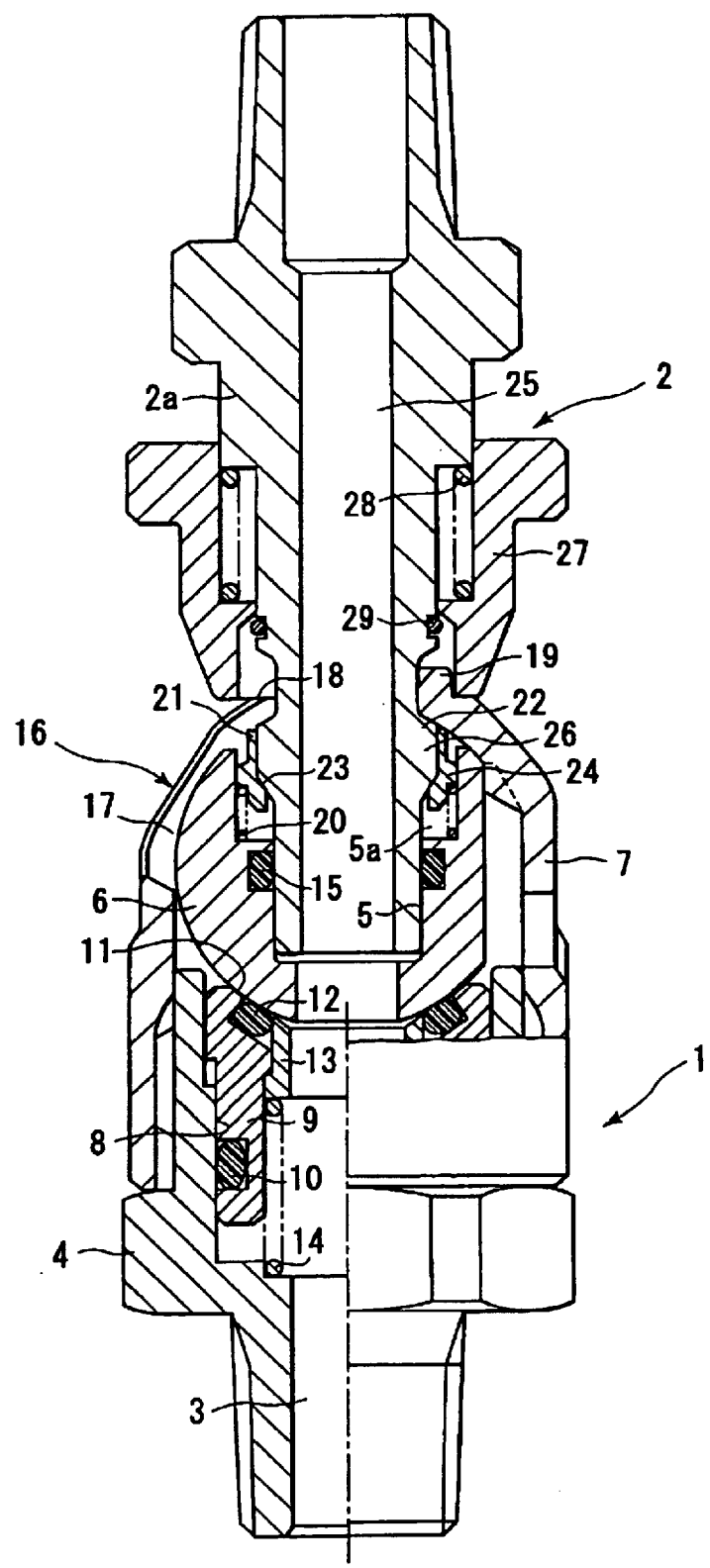
FIG. 6 is a sectional view showing the socket connected to the plug shown in FIG. 4.

If the plug body 2a is inserted into the through bore 5 of the ball valve 6 with the lock member 27 of the plug 2 retreated against the biasing force of the spring 28, in connecting the plug 2 to the socket 1, the advanced lock element 21 is pushed by the plug body 2a and retreats. Thereupon, it is disengaged from the peripheral end edge of the casing flank opening 17 (FIG. 5), so that the ball valve 6 is allowed to rock. Thus, the plug 2 and the socket 1 can be connected by rocking the plug 2 in the through bore 5 of the valve 6 along the slot 16 toward the casing top opening 18. Thereupon, the through bore 5 and the fluid passage 3 of the main cylinder 4 are aligned, and the fluid passage 3 and the fluid passage 25 of the plug 2 communicate with each other. If the retreated lock member 27 is released after the socket 1 and the plug 2 are connected in this manner, it advances urged by the spring 28, and is fitted on the fitting projection 19 on the top opening 18 of the casing 7. In consequence, the plug 2 is prevented from rocking toward the casing flank opening 17 of the slot 16, and the socket 1 and the plug 2 are locked in their connected state (FIG. 6).

In disconnecting the plug 2 from the socket 1, the lock member 27 of the plug 2 is first retreated and disengaged from the fitting projection 19. Then, it is rocked toward the casing flank opening 17 of the slot 16, and the plug body 2a is drawn out of the through bore 5 of the ball valve 6. If this is done, the lock element 21 advances urged by the spring 20. The advanced lock element 21 engages the peripheral end edge of the opening 17, thereby preventing the valve 6 from rocking. Accordingly, the through bore 5 of the valve 6 is kept opening on the side of the casing flank opening 17 so that the plug body 2a can be passed through it. Thus, the plug 2 can be reconnected securely.

According to the present embodiment, the lock element 21 is formed of a cylindrical element that is located for axial movement in the through bore 5 of the ball valve 6. The outside diameter of its distal end portion is smaller than the inside diameter of the casing flank opening 17 of the slot 16. The element 21 has an inside diameter such that the plug body 2a can be fitted in it. Further, the retaining step portion 23, which engages the projection 22 on the outer peripheral surface of the plug body 2a, protrudes from the inner peripheral surface of the cylindrical lock element 21. As the plug body 2a is inserted into the through bore 5 of the ball valve 6, the retaining step portion 23 on the inner peripheral surface of the lock element 21 that is fitted on the plug body 2a is stopped and pushed to be retreated by the projection 22 on the outer peripheral surface of the plug body 2a. Accordingly, the outside diameter and the shape of the outer peripheral surface of the plug 2 to be connected are restricted by the inside diameter and the shape of the inner peripheral surface of the cylindrical lock element 21. Thus, the plug 2 to be connected to the socket 1 can be specified, so that improper plug connection can be prevented.

What is claimed is:

1. A pipe coupling which has a socket and a plug connectable to each other, comprising:

a plug body having a distal end portion, an axial bore opening in the distal end portion, and an outer peripheral portion on which a projection is formed;

a socket main cylinder having first and second end portions and an axial bore which extends between the end portions and through which a fluid can flow;

a ball valve which has a through bore formed having one end capable of receiving the distal end portion of the plug body and the other end portion capable of communicating with the axial bore, is located at a first end portion of the socket main cylinder, and controls the axial bore in an open-close condition;

an annular seal unit located near the first end portion in the axial bore and having a distal end portion formed having a ball valve receiving surface in sealed engagement with the ball valve;

a casing which has a base portion fixed to the first end portion of the socket main cylinder, a top portion opposed to the base portion, a flank portion located between the first end portion and the top portion, and a slot extending from the flank portion to the top portion and which supports the ball valve in conjunction with the ball valve receiving surface, the slot having a flank opening, which is aligned with the one end of the through bore and through which the projection of the plug body can be passed when the other end of the through bore is disconnected from the axial bore of the socket main cylinder, and a top opening, which is aligned with the one end of the through bore and engages the projection when the other end of the through bore communicates with the axial bore of the socket main cylinder, so that the ball valve is rocked by the plug body in the one end of the through bore between a position in which the other end of the through bore communicates with the axial bore of the socket main cylinder and a position in which the other end is disconnected from the axial bore; and a lock element located for reciprocation in the through bore of the ball valve, the lock element being urged toward the one end and adapted to move into the flank opening to prevent the ball valve from rocking with respect to the casing when the one end of the through bore of the ball valve is aligned with the flank opening and to move into the through bore of the ball valve to allow the ball valve to rock with respect to the casing when the plug body is inserted into the one end of the through bore.

2. A pipe coupling according to claim 1, wherein the lock element comprises a cylindrical element, having an outer peripheral portion smaller in diameter than the flank opening and an inner peripheral portion larger in diameter than the distal end portion of the plug body, and a retaining step portion protruding from the outer peripheral portion of the cylindrical element and having a diameter larger than that of the flank opening.

3. A pipe coupling according to claim 2, wherein the lock element has a retaining step portion inwardly protruding from the inner peripheral portion and capable of engaging the projection of the plug body.

4. A pipe coupling according to claim 1, wherein the axial bore is formed of a stepped bore having a large-diameter portion and a small-diameter portion, and the seal unit has an annular seal holding member located in the large-diameter portion for axial movement, a collar located in the seal holding member for axial movement, and a seal ring located between the seal holding member and the collar and in sealed engagement with the ball valve.

5. A pipe coupling according to claim 1, wherein the casing has a fitting projection protruding from the peripheral portion of the top opening, and the plug body has a lock member which is stopped by the fitting projection to prevent the movement of the ball valve when the ball valve is rocked from the position in which the other end of the through bore is disconnected from the axial bore of the socket main cylinder to the position in which the other end communicates with the axial bore.

6. A pipe coupling according to claim 5, wherein the lock member is urged toward the distal end portion of the plug body.

7. A socket which forms a pipe coupling in conjunction with a plug having a distal end portion, an axial bore opening in the distal end portion, and an outer peripheral portion on which a projection is formed, comprising:

a main cylinder having first and second end portions and an axial bore which extends between the end portions and through which a fluid can flow;

a ball valve which has a through bore formed having one end capable of receiving the distal end portion of the plug and the other end portion capable of communicating with the axial bore, is located at a first end portion of the main cylinder, and controls the axial bore in an open-close condition;

an annular seal unit located near the first end portion in the axial bore and having a distal end portion formed having a ball valve receiving surface in sealed engagement with the ball valve;

a casing which has a base portion fixed to the first end portion of the main cylinder, a top portion opposed to the base portion, a flank portion located between the first end portion and the top portion, and a slot extending from the flank portion to the top portion and which supports the ball valve in conjunction with the ball valve receiving surface, the slot having a flank opening, which is aligned with the one end of the through bore and through which the projection of the plug can be passed when the other end of the through bore is disconnected from the axial bore of the main cylinder, and a top opening, which is aligned with the one end of the through bore and engages the projection when the other end of the through bore communicates with the axial bore of the main cylinder, so that the ball valve is rocked by the plug in the one end of the through bore between a position in which the other end of the through bore communicates with the axial bore of the main cylinder and a position in which the other end is disconnected from the axial bore; and a lock element located for reciprocation in the through bore of the ball valve, the lock element being urged toward the one end and adapted to move into the flank opening to prevent the ball valve from rocking with respect to the casing when the one end of the through bore of the ball valve is aligned with the flank opening and to move into the through bore of the ball valve to allow the ball valve to rock with respect to the casing when the plug is inserted into the one end of the through bore.

* * * * *